(12) United States Patent
Zhai et al.

(10) Patent No.: US 11,945,047 B2
(45) Date of Patent: Apr. 2, 2024

(54) COMPOSITE FORMING SYSTEM COMBINING ADDITIVE MANUFACTURING AND FORGING AND METHODS FOR SAME

(71) Applicant: General Electric Company, Schenectady, NY (US)

(72) Inventors: Zirong Zhai, ShangHai (CN); Dalong Zhong, ShangHai (CN); Yingna Wu, ShangHai (CN); Bin Wei, Niskayuna, NY (US); Yong Yang, ShangHai (CN); Xiaobin Chen, ShangHai (CN)

(73) Assignee: General Electric Company, Schenectady, NY (US)

( * ) Notice: Subject to any disclaimer, the term of this patent is extended or adjusted under 35 U.S.C. 154(b) by 391 days.

(21) Appl. No.: 16/759,025

(22) PCT Filed: Oct. 26, 2018

(86) PCT No.: PCT/US2018/057749
§ 371 (c)(1),
(2) Date: Apr. 24, 2020

(87) PCT Pub. No.: WO2019/084430
PCT Pub. Date: May 2, 2019

(65) Prior Publication Data
US 2021/0178520 A1    Jun. 17, 2021

(30) Foreign Application Priority Data

Oct. 26, 2017    (CN) .......................... 201711013952.7

(51) Int. Cl.
*B23K 26/354* (2014.01)
*B21J 5/00* (2006.01)
(Continued)

(52) U.S. Cl.
CPC ............. *B23K 26/354* (2015.10); *B21J 5/002* (2013.01); *B22F 10/25* (2021.01); *B22F 10/28* (2021.01);
(Continued)

(58) Field of Classification Search
CPC ......... B33Y 10/00; B33Y 30/00; B33Y 40/00; B33Y 80/00; B33Y 50/00; B33Y 50/02;
(Continued)

(56) References Cited

U.S. PATENT DOCUMENTS 8,383,985 B2    2/2013    Twelves, Jr. et al.
9,302,338 B2    4/2016    Zhang et al.
(Continued)

FOREIGN PATENT DOCUMENTS

CN    103962560 A    8/2014
CN    104923789 A    9/2015
(Continued)

OTHER PUBLICATIONS

PCT International Search Report Corresponding to PCT/US2018/057749 dated Feb. 13, 2019.
(Continued)

*Primary Examiner* — Chris Q Liu
(74) *Attorney, Agent, or Firm* — Dority & Manning, P.A.

(57) ABSTRACT

The present invention relates to an additive manufacturing system and its methods. The system includes a material conveyor, an energy source, and a micro-forging device. The material conveyor is configured to convey material. The energy source is configured to direct an energy beam toward the material, the energy beam fuses at least a portion of the material to form a solidified portion. The micro-forging device is movable along with the material conveyor for forging the solidified portion, wherein the micro-forging device comprises a first forging hammer and a second
(Continued)

forging hammer, the first forging hammer is configured to impact the solidified portion to generate a first deformation, and the second forging hammer is configured to impact the solidified portion to generate a second deformation greater than the first deformation.

10 Claims, 5 Drawing Sheets

(51) Int. Cl.
    *B22F 10/25* (2021.01)
    *B22F 10/28* (2021.01)
    *B22F 10/50* (2021.01)
    *B23K 26/34* (2014.01)
    *B33Y 10/00* (2015.01)
    *B33Y 30/00* (2015.01)
    *B33Y 40/00* (2020.01)
    *B33Y 40/20* (2020.01)
    *B22F 12/00* (2021.01)

(52) U.S. Cl.
    CPC .............. *B22F 10/50* (2021.01); *B23K 26/34* (2013.01); *B33Y 10/00* (2014.12); *B33Y 30/00* (2014.12); *B33Y 40/00* (2014.12); *B33Y 40/20* (2020.01); *B22F 12/222* (2021.01)

(58) Field of Classification Search
CPC .. B33Y 70/00; B23K 26/342; B23K 15/0086; B23K 10/027; B23K 26/32; B23K 26/34; B23K 26/702; B23K 15/0093; B23K 2101/001; B23K 2103/14; B23K 2103/50; B23K 10/006; B23K 15/002; B23K 15/0026; B23K 2103/05; B23K 2103/08; B23K 2103/16; B23K 2103/26; B23K 2103/52; B23K 26/0006; B23K 26/0093; B23K 26/0853; B23K 26/144; B23K 35/0244; B23K 35/3053; B23K 9/044; B23K 1/0018; B23K 1/20; B23K 11/0006; B23K 11/0013; B23K 11/257; B23K 11/309; B23K 15/0006; B23K 15/02; B23K 20/10; B23K 20/1255; B23K 20/1275; B23K 2101/35; B23K 2103/04; B23K 25/005; B23K 26/034; B23K 26/0604; B23K 26/083; B23K 26/0861; B23K 26/0869; B23K 26/1224; B23K 26/123; B23K 26/1476; B23K 26/16; B23K 26/22; B23K 26/346; B23K 26/352; B23K 26/356; B23K 26/3576; B23K 26/364; B23K 26/60; B23K 26/70; B23K 26/703; B23K 28/02; B23K 35/30; B23K 35/3033; B23K 35/3046; B23K 35/3066; B23K 9/04; B23K 9/042; B23K 9/32
USPC ........ 219/76.12, 74, 121.64, 121.66, 121.86, 219/73.21, 76.1, 76.14
See application file for complete search history.

(56) References Cited

U.S. PATENT DOCUMENTS

| | | |
|---|---|---|
| 9,429,023 B2 | 8/2016 | Godfrey et al. |
| 9,987,707 B2 | 6/2018 | Dong et al. |
| 2011/0293840 A1 | 12/2011 | Newkirk et al. |
| 2015/0273631 A1 | 10/2015 | Kenney et al. |
| 2016/0090842 A1 | 3/2016 | Luo et al. |
| 2016/0167156 A1 | 6/2016 | Burke et al. |
| 2016/0175984 A1 | 6/2016 | Dalle Donne et al. |
| 2017/0165789 A1 | 6/2017 | Demos |
| 2017/0252860 A1 | 9/2017 | Bamberg et al. |
| 2017/0259434 A1* | 9/2017 | Takeda ................ B25J 15/0061 |
| 2017/0326681 A1 | 11/2017 | Sidhu et al. |

FOREIGN PATENT DOCUMENTS

| | | |
|---|---|---|
| CN | 106112254 A | 11/2016 |
| CN | 206169044 U | 5/2017 |
| CN | 106825348 A | 6/2017 |
| CN | 107287588 A | 10/2017 |
| WO | WO2016/092253 A1 | 6/2016 |

OTHER PUBLICATIONS

Ding et al., Wire-feed additive manufacturing of metal components: technologies, developments and future interests, The International Journal of Advanced Manufacturing Technology, vol. 81, Issue 1, Oct. 2015, pp. 465-481.

* cited by examiner

COMPOSITE FORMING SYSTEM COMBINING ADDITIVE MANUFACTURING AND FORGING AND METHODS FOR SAME

TECHNICAL FIELD

The invention relates to the field of additive manufacturing technology, and in particular to a composite forming system and method combining additive manufacturing and forging.

BACKGROUND

Additive manufacturing technology is an emerging technology for material processing that is rapidly developing. At present, the mainstream additive manufacturing usually achieves metallurgical bonding of metal materials through the "melting-solidification" method, which is characterized by using a high-energy beam such as a laser beam, an electron beam or an arc beam as a heat source to melt the synchronously fed metal material, such as metal powder, metal wire, and so on, which are stacked in layers, whereby parts are manufactured by surfacing, and the internal microstructure of the obtained parts is a solidified structure.

Compared with the conventional forged structure, the solidified structure obtained by the above-mentioned "melting-solidification" method produces crystals that are very coarse with obvious directionality, therefore in a general sense, it is difficult to achieve comprehensive performance comparable to that of a forged material. In order to improve the mechanical properties of the obtained parts and reduce internal defects, a method of combining the molten deposition additive with thermomechanical processing has been gradually developed, that is, material deposition and metallurgical bonding are achieved by melting-solidification, thereafter rolling, shock processing and other treatments are used to refine the grains and improve internal quality.

Although the method of melting combined with forging can improve the internal quality as well as enhance performance to some extent, in this composite processing method, due to the high complexity of the process and the equipment, as well as due to the rapid solidification and cooling rate, the forging condition which includes the temperature and other parameters cannot be effectively controlled, thus affecting the scope of application of the materials as well as the effect of forging.

Therefore, new technologies are needed to solve at least one of the above problems.

SUMMARY

The objective of the present invention is to provide a composite forming system combining additive manufacturing and forging as well as its methods.

In one aspect, embodiments of the present invention relate to an additive manufacturing system comprising a material conveyor, an energy source, and a micro-forging device. The material conveyor is configured to convey material. The energy source is configured to direct an energy beam toward the material, the energy beam fuses at least a portion of the material to form a solidified portion. The micro-forging device is movable along with the material conveyor for forging the solidified portion, wherein the micro-forging device comprises a first forging hammer and a second forging hammer, the first forging hammer is configured to impact the solidified portion to generate a first deformation, and the second forging hammer is configured to impact the solidified portion to generate a second deformation greater than the first deformation.

In another aspect, embodiments of the present invention relate to an additive manufacturing method. The method comprises: feeding a material via a material conveyor to a platen; directing an energy beam towards the material to fuse at least a portion of the material to form a solidified portion; and forging the solidified portion by: moving a micro-forging device comprising a first forging hammer and a second forging hammer, along with the material conveyor; impacting the solidified portion with the first forging hammer to generate a first deformation; and impacting the solidified portion with the second forging hammer to generate a second deformation greater than the first deformation.

BRIEF DESCRIPTION OF DRAWINGS

To read the following detailed description with reference to the accompanying drawings can help understand the features, aspects and advantages of the present invention, where.

DETAILED DESCRIPTION OF EMBODIMENTS

"Comprise", "include", "have", and similar terms used in the present application are meant to encompass the items listed thereafter and equivalents thereof as well as other additional items. Approximating language in the present application is used to modify a quantity, indicating that the present invention is not limited to the specific quantity, and may include modified parts that are close to the quantity, acceptable, and do not lead to change of related basic functions.

In the specifications and claims, unless otherwise clearly indicated, no limitation is imposed on singularity and plurality of all items. Unless otherwise clearly indicated, the terms "OR", "or" do not mean exclusiveness, but mean at least one of the mentioned item (such as ingredients), and include a situation where a combination of the mentioned exists.

"Some embodiments" and the like mentioned in the present application specification represent that specific elements (such as a characteristic, structure, and/or feature) related to the present invention are included in at least one embodiment described in the specification, and may or may not appear in another embodiment. In addition, it should be understood that the invention elements can be combined in any manner.

Figure 1:
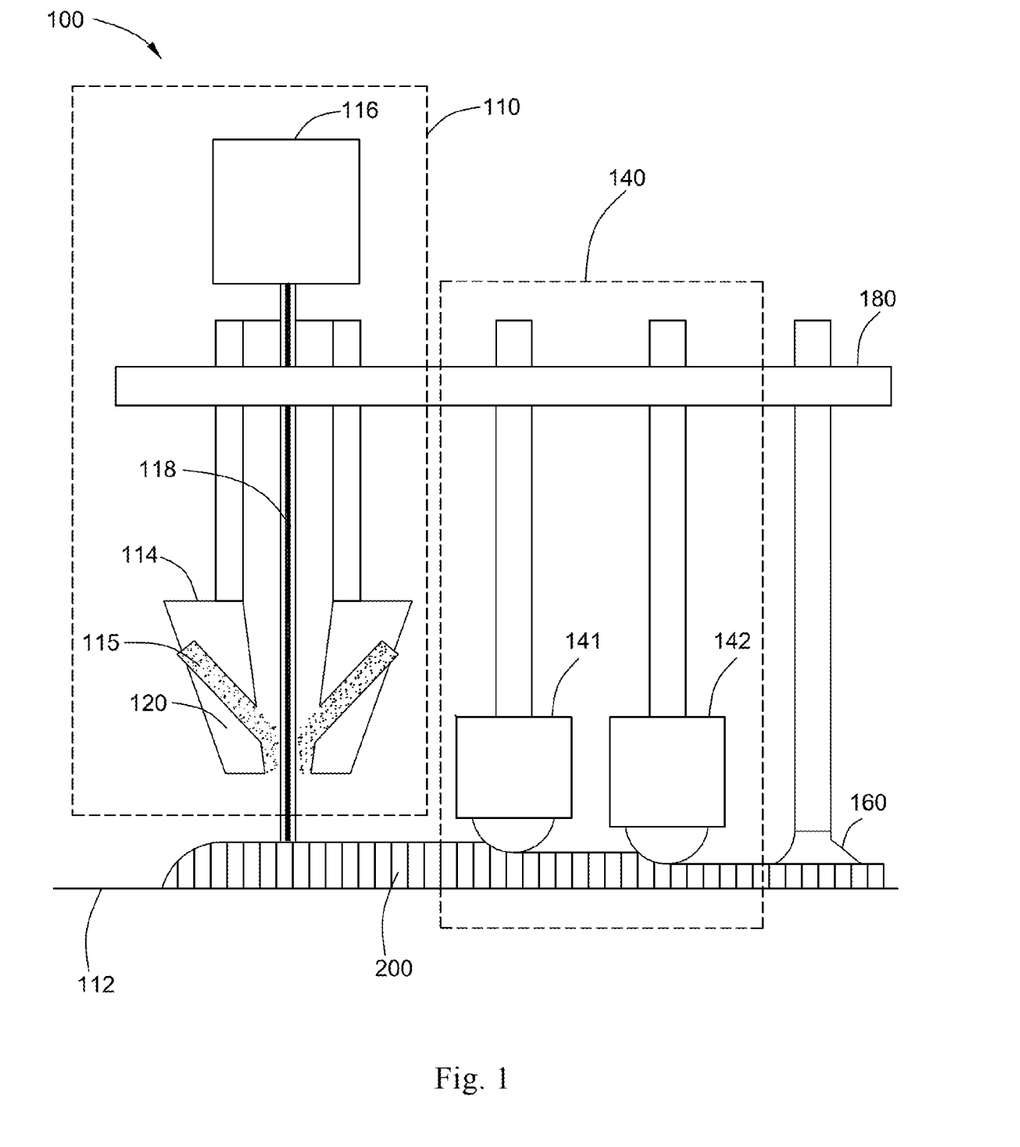
FIG. 1 is a schematic view of a composite forming system in accordance with one embodiment of the present invention.

Embodiments of the present invention relate to an additive manufacturing system and its methods, comprising an additive manufacturing device for forming an object layer-by-layer by additive manufacturing techniques, and a micro forging device used for real-time micro-forging by matching the object being formed by the additive manufacturing device synchronously layer-by-layer. Wherein the additive manufacturing device may comprise: a platen provided to support the object being formed, a material conveyor configured to feed material onto the platen or the object being formed, and an energy source configured to provide an energy beam, which directs the energy beam toward the material when it is being fed and melts it to form a solidified portion. Specifically, the real-time micro-forging device is movable synchronously with the material conveyor for forging the solidified portion after the material conveyor. The real-time micro-forging device comprises a first forging hammer and a second forging hammer, the first forging hammer being configured to pre-forge the solidified portion and generate a first deformation, the second forging hammer being configured to forge the pre-forged solidified portion and generate a second deformation greater than the first deformation FIG. 1 shows a schematic diagram of a composite forming system 100 in accordance with one embodiment of the present invention. As shown in FIG. 1, the composite forming system 100 comprises an additive manufacturing device 110 and a real-time micro-forging device 140. Of which, the additive manufacturing device 110 is used to form a target object layer-by-layer, specifically comprising a platen 112, a material conveyor 114, and an energy source 116. The platen 112 is used to support the object 200 being formed. The material conveyor 114 is used to feed material 115 to the platen 112 or the object 200 being formed. The energy source 116 is used to provide an energy beam 118 that, when the material 115 is sent to the platen 112 or object 200, causes the energy beam 118 to be directed toward the material 115 and melt it, whereby the molten material rapidly solidifies to form a solidified portion and become part of the object being formed. The real-time micro-forging device 140 is movable synchronously with the material conveyor 114 for forging the formed solidified portion in real-time after the material conveyor 114.

The energy source 116 can be any device or equipment capable of providing an energy beam suitable for additive manufacturing. Specific examples of the energy beam include, but are not limited to, a laser beam, an electron beam, and an arc beam. The material 115 is typically delivered in the form of a powder or wire (e.g., metal powder, wire, etc.). The material conveyor 114 may comprise a powder feed nozzle for conveying powder material, or a wire feeding device for conveying the wire. In some embodiments, the material conveyor 114 comprises a powder feed nozzle or wire feed device that is coaxial with the energy beam. For example, in the embodiment illustrated in FIG. 1, the material conveyed by the material conveyor 114 is in powder form and comprises a powder feed nozzle 120 coaxial with the energy beam 118. Specifically, the powder feed nozzle 120 is provided with a coaxial powder feeding passage and an energy beam passage, and a central axis of the powder flow formed by the powder material flowing in the powder feeding passage substantially coincides with a central axis of the energy beam. By coaxial arrangement, it is possible to provide a stable and uniform concentration of powder flow while reducing mechanical interference during processing. In other embodiments, the material conveyed by the material conveyor 114 may be in the form of a wire, and the material conveyor 114 may comprise a wire feeding device that is coaxial the with energy beam 118.

In some embodiments, the real-time micro-forging device 140 comprises two or more forging hammers, the hammers are able to control parameters such as respective forging force and hammering frequency independently of each other. In the embodiment shown in FIG. 1, the real-time micro-forging device 140 comprises a first forging hammer 141 and a second forging hammer 142, the first forging hammer 141 being configured to pre-forge the solidified portion and generate a first deformation, the second forging hammer 142 being configured to forge the pre-forged solidified portion and generate a second deformation. The second deformation may be made by controlling parameters of the first and second forging hammers, such as causing at least one of the forging force and the hammering frequency of the second forging hammer 142 to be greater than the first forging hammer 141, resulting in the second deformation being greater than the first deformation. In some embodiments, the second forging hammer 142 may be made higher in frequency compared to the first forging hammer, for example, the first forging hammer 141 may have a pre-forging frequency of 2 Hz to 10 Hz, while the second forging hammer 142 has a forging frequency of 10 Hz to 50 Hz.

In some embodiments, the deformations generated by each forging hammer can be controlled, and the total deformation generated by the entire real-time micro-forging device 140 can also be controlled, for example, the total deformation can be controlled to be no greater than a range of 50%. In some specific embodiments, the first deformation can be controlled within the range of 5% to 15%, and the second deformation can be controlled within the range of 15% to 35%.

In some embodiments, the real-time micro-forging device 140 may further comprise more forging hammers, for example, further comprising a third forging hammer (not shown) configured to perform further forging after the solidified portion being forged by the second forging hammer 142, and generate a third deformation greater than the second deformation.

In some embodiments, the real-time micro-forging device 140 is movable relative to the additive manufacturing device 110, thereby adjusting its distance from the center of the molten pool (the location at which the material is melted). For example, in some specific embodiments, the real-time micro-forging device 140 is movable relative to the material conveyor 114 between a hot forging position and a cold forging position, wherein, when the real-time micro-forging device 140 is located at the hot forging position, the first forging hammer 141 performs pre-forging at a position of 2 mm to about 9 mm from a molten pool, and when the real-time micro-forging device 140 is located at the cold forging position, the first forging hammer 141 performs pre-forging at a position greater than 9 mm from the molten pool. In some embodiments, when the real-time micro-forging device 140 is located at the cold forging position, the real-time forging (including the pre-forging performed by the first forging hammer 141 and the forging performed by the second forging hammer 142) is performed at a temperature ranging from 30% to 50% of the melting point of the material. When the real-time micro-forging device 140 is located at the hot forging position, the real-time forging is performed at a temperature ranging from 60% to 80% of the melting point of the material.

The composite forming system 100 may comprise control devices (not shown) to realize control of the additive manufacturing device 110, the real-time micro-forging device 140, and other devices in the system, including but not limited to: control of the relative position of the real-time micro-forging device 140, control of the motion parameters of multiple forging hammers.

In some specific embodiments, the control device can adaptively adjust the distance to the center of the molten pool based on the energy beam used by the additive manufacturing device 110. When the energy beam is an arc beam, the real-time micro-forging device 140 is located at the cold forging position, the first forging hammer head 141 performs pre-forging at a position greater than 9 mm from the molten pool, the real-time forging (including the forging performed by the first forging hammer 141 and the forging performed by the second forging hammer 142) is performed at a temperature ranging from 30% to 50% of the melting point of the material. When the energy beam is a laser beam or an electron beam, the first forging hammer 141 performs pre-forging at a position 2 mm to 9 mm from the molten pool, the real-time micro-forging device 140 is located at the hot forging position, the real-time forging is performed at a temperature ranging from 60% to 80% of the melting point of the material. For example, for a nickel-based alloy having a melting point of about 1,600° C., the cold forging is generally performed at a temperature ranging from 480° C. to 800° C., and the hot forging is generally performed at a temperature ranging from 960° C. to 1,280° C.

The composite forming system 100 may further comprise a real-time polishing device 160 that can be moved synchronously with the real-time micro-forging device 140 by following the real-time micro-forging device 140, to perform real-time polishing of the solidified portion after being forged by the real-time micro-forging device 140 and eliminate unevenness resulting from forging, thereby facilitating material stacking and additive manufacturing for the subsequent layer. The polishing device may comprise a micro-grinding wheel or a micro-milling cutter to smooth the forged portion. In some specific embodiments, the additive manufacturing device 110, the real-time micro-forging device 140, and the real-time polishing device 160 are sequentially arranged, such that the materials melted at the molten pool may be forged by a plurality of hammers arranged in sequence after solidification, to repeat the steps of melting-solidification-multiple forging-polishing after polishing to obtain the next layer.

In some embodiments, the additive manufacturing device 110, the real-time micro-forging device 140, and the real-time polishing device 160 are connected by a certain connecting mechanism 180. The arrangement of the connecting mechanism 180 enables relative motion and synergy between the devices 110, 140, 160. The connecting mechanism comprises, but is not limited to, a connecting rod, a bracket, a sliding device, and so on.

The composite forming system 100 is widely applicable to various materials for additive manufacturing, and is particularly suitable for high-temperature alloy materials such as nickel-based and cobalt-based alloys, whose mechanical properties are not substantially degraded in a use environment below 650° C.

Figure 2:
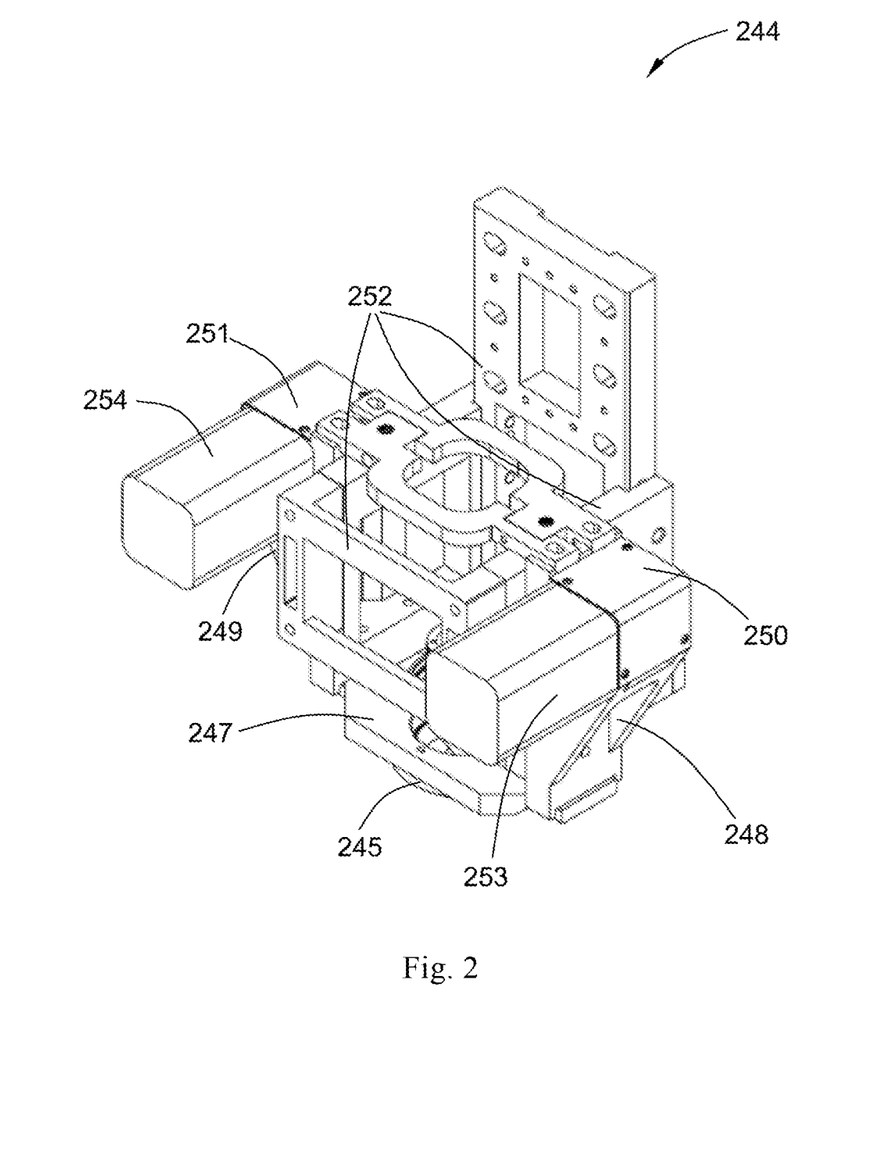
FIG. 2 shows a hammer device suitable for use in the real-time micro-forging device of the composite forming system in FIG. 1.

FIG. 2 shows a hammer assembly 244 suitable for use in the real-time micro-forging device of the composite forming system 100, comprising a forging hammer 245 and corresponding auxiliary mounts and drive mechanisms. As shown in FIG. 2, the hammer 245 is mounted to the base 247 by a hammer mount that is coupled to a pair of symmetrically disposed slidable brackets 248, 249. The slidable brackets 248, 249 are able to slide up and down respectively along the guide rails (not visible in FIG. 2, only one side of the rail is visible in FIG. 3) formed on the fixed bracket 252 when being driven by the eccentrics connected thereto (not visible in the drawings, respectively under the outer covers 250, 251), thereby causing the hammer 245 to vibrate up and down at a certain frequency and amplitude. The eccentrics under the outer covers 250, 251 are respectively driven by motors 253, 254 that act as power sources, and the motors 253, 254 may be stepper motors or servo motors. In the embodiment shown in FIG. 2, the drive mechanism comprising the slidable bracket 248, the eccentric under the outer cover 250, the motor 253 and the guide rail (not visible in FIG. 2, 255 in FIG. 3) as well as the drive mechanism comprising the slidable bracket 249, the eccentric under the outer cover 251, the motor 254 and the guide rail (not visible in the drawing) are symmetrically disposed on both sides of the fixed bracket 252, and the symmetrically arranged driving mechanisms act together to drive and generate a stable and controllable vibration.

Figure 3:
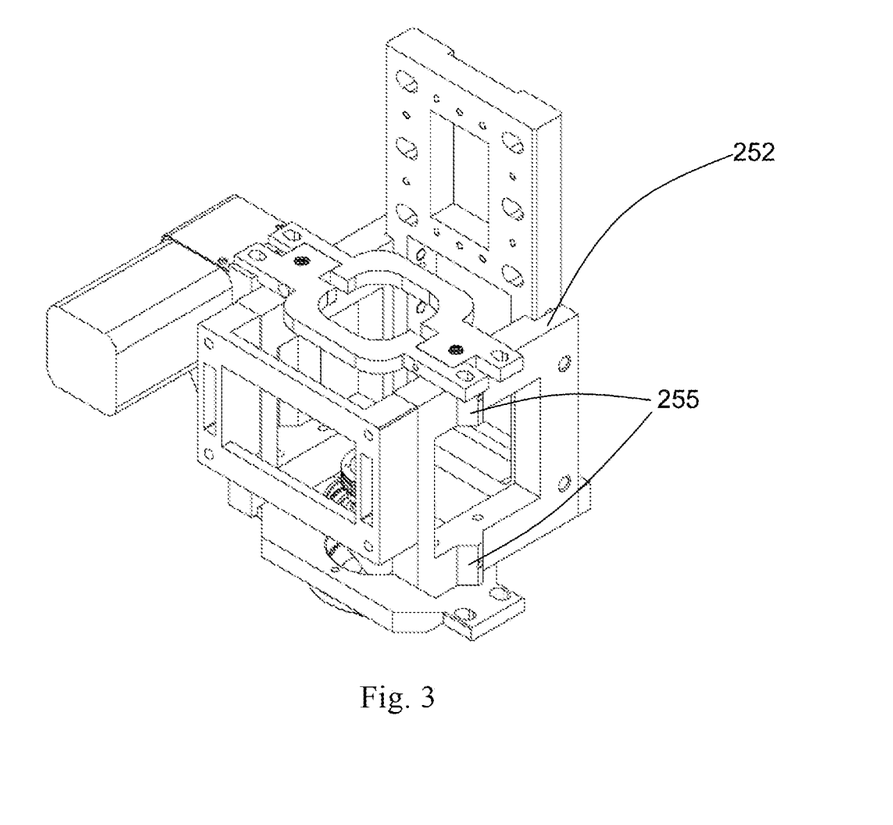
FIG. 3 shows a simple rail structure suitable for use with the hammer assembly in FIG. 2.
Figure 4:
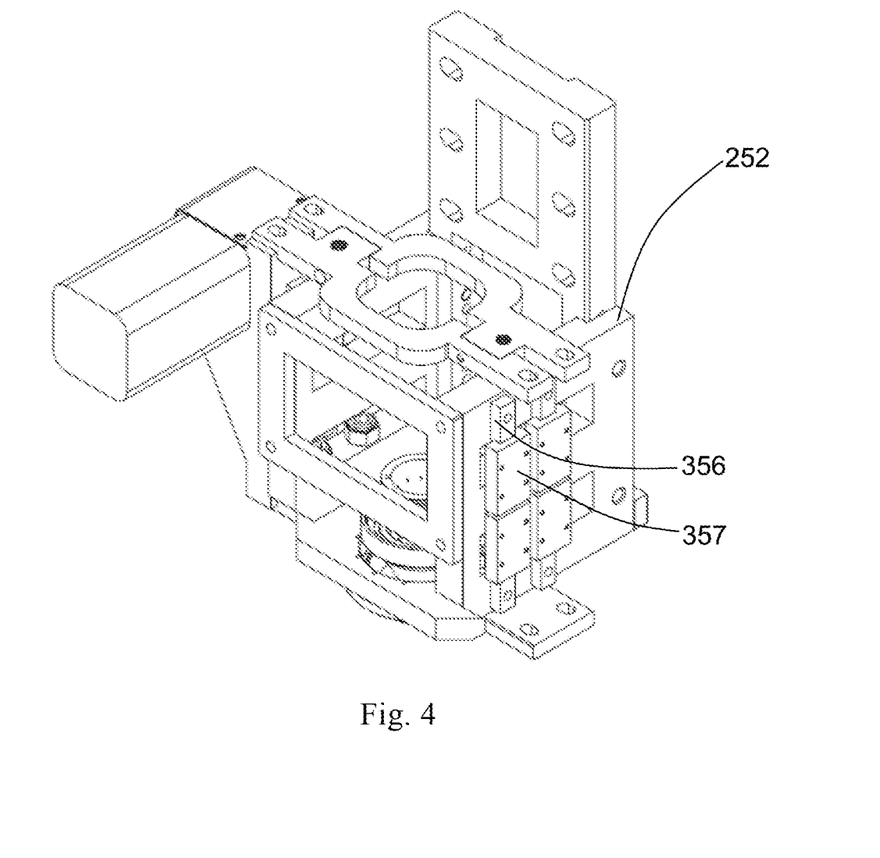
FIG. 4 shows a linear guide structure suitable for use with the hammer assembly in FIG. 2.

FIG. 3 shows a simple rail structure, the rails (only one side of the rail 255 is visible) are directly in contact with the slidable brackets 248, 249, the structure is simple and suitable for the vibration of the hammer at a small frequency and amplitude. In other embodiments, a sliding member such as a slider may be provided on the guide rail to mount the slidable bracket to the sliding member, and to cause the sliding member to slide along the guide rail. For example, FIG. 4 shows a linear guide rail 356 having a slider 357 along which it can slide, the slidable bracket 248 or 249 can be mounted on the slider 357, such a linear guide rail with the slider is more stable and reliable, therefore it is more suitable for the case where the hammer vibrates at a higher frequency and a greater amplitude.

The hammer assembly 244 can be used as any of the forging hammers in the composite forming system 100 shown in FIG. 1, comprising but not limited to the first hammer 141 and the second forging hammer 142, and the hammer assembly 244 can be connected to other devices in the system, such as additive manufacturing devices and real-time polishing devices, through a structure such as a connecting rod.

Figure 5:
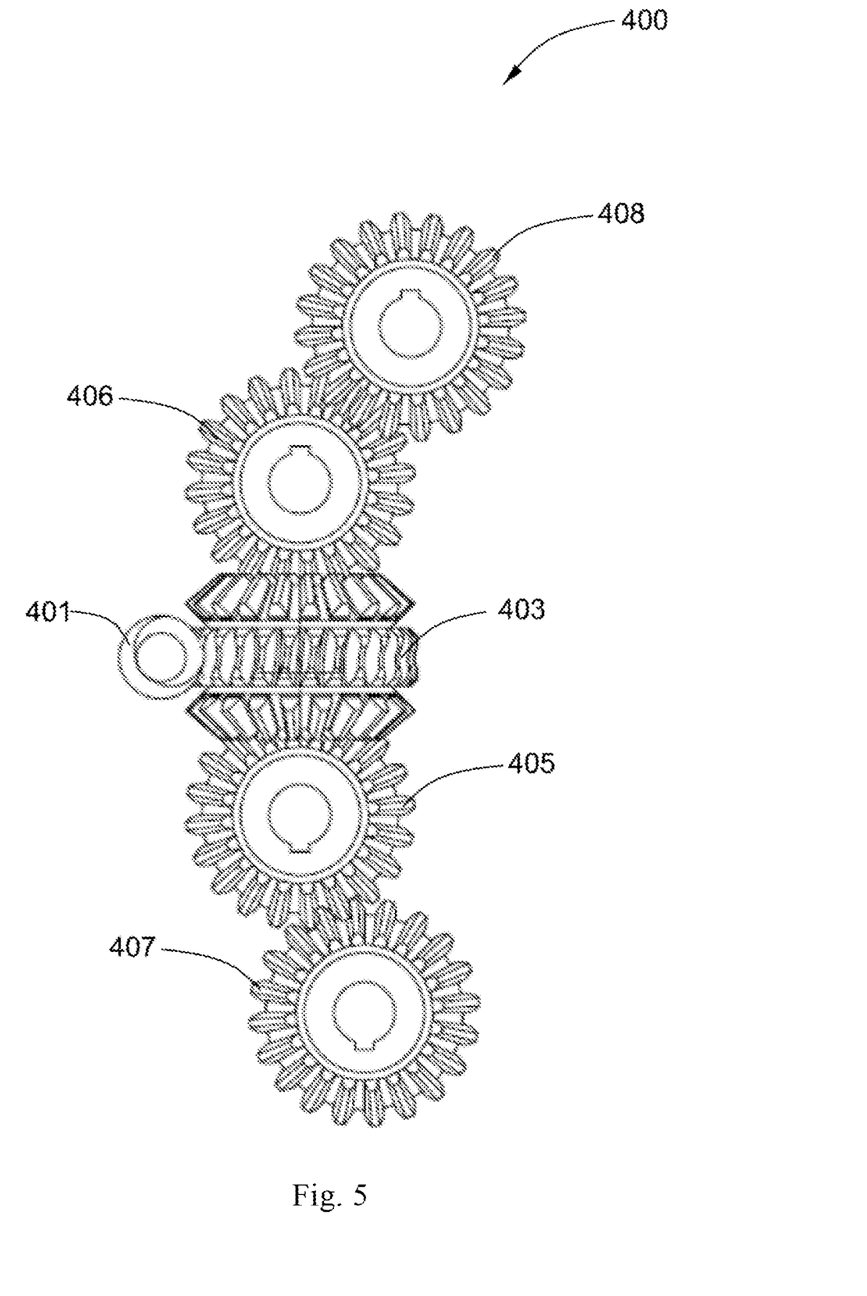
FIG. 5 shows a transmission mechanism that can drive two of the eccentrics of the hammer assembly in FIG. 2 using a single motor.

FIG. 5 shows a transmission mechanism 400 that can drive two of the eccentrics of the hammer assembly 244 in FIG. 2 using a single motor, the transmission mechanism 400 comprising a worm 401, a main turbine 403 that engages with the worm 401, the slave turbines 405 and 406 that engage with the main turbine 403, the forward turbine 407 that engages with the slave turbine 405, and the reverse turbine 408 that engages with the slave turbine 406. Of which, the main turbine 403 comprises gears that engage with the worm 401, as well as left and right hand gears that engage with the slave turbines 405 and 406, respectively. The worm 401 can be coupled to and driven by a motor, the forward turbine 407 and the reverse turbine 408 can be respectively coupled to two eccentrics of the hammer assembly 244 shown in FIG. 2, and thus is able to drive the two eccentrics through the single motor connected to the worm 401, which avoids synchronization problems that may occur with the use of two motors.

Since the real-time micro-forging device comprises two or more forging hammers, each of the layers formed by the additive manufacturing can be hammered by the hammers several times, which can solve the problem of the previous layer remelting due to the heat input from the forming process of the subsequent layer to a certain extent, which may occur during the layer-by-layer stack forming process.

While the present invention has been described with reference to specific embodiments thereof, it will be understood by those skilled in the art that many modifications and variations can be made thereto. It is, therefore, to be understood that the appended claims are intended to cover all such

What we claim is:

1. An additive manufacturing system, comprising:
   a material conveyor configured to feed a material;
   an energy source configured to direct an energy beam toward the material to fuse at least a portion of the material to form a solidified part;
   a microforging device movable along with the material conveyor for forging the solidified part, wherein the microforging device comprises a first forging hammer configured to impact the solidified part to generate a first deformation and a second forging hammer configured to impact the solidified part to generate a second deformation greater than the first deformation, and wherein the microforging device is movable relative to the material conveyor between a hot forging position and a cold forging position farther away from the material conveyor than the hot forging position;
   a connector, wherein the material conveyor and the microforging device are each attached to the connector, and the microforging device is movable along the connector relative to the material conveyor between the hot forging position and the cold forging position;
   a control device that controls the microforging device by operating the first forging hammer at a first frequency and operating the second forging hammer at a second frequency greater than the first frequency to generate the second deformation greater than the first deformation; and
   a polishing device synchronously movable with the microforging device that can polish the solidified part after the microforging device forges the solidified part by abrading or cutting a surface of the solidified part by physical contact between the surface and the polishing device, wherein the polishing device is attached to the connector.

2. The additive manufacturing system according to claim 1, wherein the first forging hammer is configured to impact the solidified part at a position about 2 mm to about 9 mm from a molten pool where the material is fused, when the microforging device is at the hot forging position, and the first forging hammer is configured to impact the solidified part at a position more than about 9 mm from the molten pool, when the microforging device is at the cold forging position.

3. The additive manufacturing system according to claim 1, wherein the energy beam is selected from the group consisting of a laser beam, an electron beam, an ion beam and a combination thereof.

4. The additive manufacturing system according to claim 1, wherein the material conveyor comprises a powder feed nozzle coaxial with the energy beam.

5. The additive manufacturing system according to claim 1, wherein the material conveyor comprises a wire feed unit coaxial with the energy beam.

6. The additive manufacturing system according to claim 1, wherein the microforging device is adapted to move relative to the material conveyor in response to the energy beam used.

7. The additive manufacturing system according to claim 1, wherein the first forging hammer is configured to impact the solidified part at a frequency from 2 Hz to about 10 Hz, and wherein the second forging hammer is configured to impact the solidified part at a frequency from 10 Hz to about 50 Hz.

8. The additive manufacturing system according to claim 1, further comprising a base to which the first forging hammer is mounted, and a pair of vertically slidable brackets coupled to the base, the vertically slidable brackets configured to be driven vertically to cause the first forging hammer to vibrate at the first frequency.

9. An additive manufacturing system, comprising:
   a material conveyor configured to feed a material;
   an energy source configured to direct an energy beam toward the material to fuse at least a portion of the material to form a solidified part;
   a microforging device movable along with the material conveyor for forging the solidified part, wherein the microforging device comprises a first forging hammer configured to impact the solidified part to generate a first deformation and a second forging hammer configured to impact the solidified part to generate a second deformation greater than the first deformation, and wherein the microforging device is movable relative to the material conveyor between a hot forging position and a cold forging position farther away from the material conveyor than the hot forging position;
   a connector, wherein the material conveyor and the microforging device are each attached to the connector, and the microforging device is movable along the connector relative to the material conveyor between the hot forging position and the cold forging position;
   a control device that controls a relative position of the microforging device and a motion parameter of the microforging device, wherein the motion parameter comprises a first vibration frequency for the first forging hammer and a second vibration frequency for the second forging hammer; and
   a polishing device synchronously movable with the microforging device that can polish the solidified part after the microforging device forges the solidified part by abrading or cutting a surface of the solidified part by physical contact between the surface and the polishing device, wherein the polishing device is attached to the connector.

10. The additive manufacturing system of claim 9, wherein the second vibration frequency is greater than the first vibration frequency to generate the second deformation greater than the first deformation.

* * * * *